(12) United States Patent
Gerard et al.

(10) Patent No.: US 8,662,045 B2
(45) Date of Patent: Mar. 4, 2014

(54) CYLINDER HEAD ASSEMBLY FOR AN INTERNAL COMBUSTION ENGINE

(75) Inventors: Dale A. Gerard, Bloomfield Hills, MI (US); Ping-Ho Tsai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1246 days.

(21) Appl. No.: 12/534,430

(22) Filed: Aug. 3, 2009

(65) Prior Publication Data

US 2011/0023810 A1    Feb. 3, 2011

(51) Int. Cl.
*F01L 3/00* (2006.01)

(52) U.S. Cl.
USPC ..................... 123/188.8; 277/592

(58) Field of Classification Search
USPC .......... 123/188.8, 193.5; 29/888.44, 888.4, 29/888.06; 277/591–596, 627; 251/171, 251/174
See application file for complete search history.

(56) References Cited

U.S. PATENT DOCUMENTS

| | | | | | |
|---|---|---|---|---|---|
| 1,751,664 | A | * | 3/1930 | Smith | 123/188.8 |
| 1,903,485 | A | * | 4/1933 | Smith, Jr. | 123/188.8 |
| 2,035,165 | A | * | 3/1936 | Jardine | 123/188.8 |
| 2,178,895 | A | * | 11/1939 | Myers | 123/188.11 |
| 2,218,722 | A | * | 10/1940 | Ross | 29/800 |
| 2,517,114 | A | * | 8/1950 | Karcher et al. | 123/188.8 |
| 2,753,859 | A | * | 7/1956 | Bartlett | 428/539.5 |
| 2,949,901 | A | * | 8/1960 | Spencer et al. | 123/41.82 R |
| 3,046,965 | A | * | 7/1962 | Kauffmann et al. | 123/188.8 |
| 3,115,127 | A | * | 12/1963 | Spencer et al. | 123/41.82 R |
| 5,582,415 | A | * | 12/1996 | Yoshida et al. | 277/592 |
| 5,787,853 | A | * | 8/1998 | Adachi et al. | 123/193.5 |
| 5,860,401 | A | | 1/1999 | Adachi et al. | |
| 6,260,531 | B1 | | 7/2001 | Haan et al. | |
| 2006/0162686 | A1 | * | 7/2006 | Heigl | 123/188.8 |

OTHER PUBLICATIONS

Rikito Eguchi, Toshihiro Higashira and Takema Toyoda, "Development of Rubber Pre-coated Metal Gasket Materials", SAE Technical Paper Series, Feb. 23-26, 1998, pp. 1-7.

Frank Popielas, Colin Chen, Martin Mockenhaupt and James Pietraski, "MLS Influence on Engine Structure and Sealing Function", SAE Technical Paper Series, Mar. 3-6, 2003, pp. 1-12.

Manshu Kameike, Jaewook Kang, Shuichi Imai, Namieki Osawa and Tomonori Funatsu, "Comprehensive Simulation for Optimization of Engine Cylinder Head Gasket Design", 2005 ABAQUS Users Conference, pp. 1-14.

* cited by examiner

*Primary Examiner* — Hung Q Nguyen
(74) *Attorney, Agent, or Firm* — Cantor Colburn LLP

(57) ABSTRACT

A sealing system for the cylinder head valve seat pocket to valve seat insert interface of a cylinder head assembly comprises a valve seat pocket gasket compressed between a valve seat insert pocket and a valve seat insert having an active layer of material with at least one seal, defining a compression seal at the interface of the seal and the valve seat insert pocket, the valve seat insert or both, to thereby prevent the ingress of fuel or water between the valve seat insert and the valve seat insert pocket.

20 Claims, 5 Drawing Sheets

CYLINDER HEAD ASSEMBLY FOR AN INTERNAL COMBUSTION ENGINE

FIELD OF THE INVENTION

This invention relates to a cylinder head assembly for an internal combustion engine having a valve seat insert and, more particularly, to a cylinder head sealing assembly that resists cylinder head corrosion.

BACKGROUND

Valve seat inserts may be installed in the cylinder heads of internal combustion engines to improve durability. Such inserts are often employed in cylinder heads comprised of softer and lighter alloys which may not have the robust strength, hardness, wear and other material characteristics required for high temperature high wear environments. The valve seat inserts are typically press-fitted into a valve seat insert pocket in the cylinder head and are often manufactured from a relatively hard, wear-resistant and heat resistant material such as a cast or sintered metal. When installed in the cylinder head, the valve seat inserts are effective to provide a durable seating surface for the engine's reciprocating valves.

The press-fit mating of the valve seat insert with the cylinder head valve seat insert pocket may result in the formation of minute gaps or crevices at the interface of the valve seat insert and the cylinder head material. During operation of the engine, liquids and vapors, including fuel, water or other contaminants may enter these openings and become trapped between the surface of the valve seat insert and the cylinder head valve seat insert pocket. While the trapped liquids or vapors are relatively benign in engines which operate on fuels containing a relatively low percentage of alcohols, such as most fuels that use ethanol, it may be corrosive in engines operating on fuels containing a relatively high percentage of alcohols, that may include methanol or other corrosive contaminants and components, especially in situations in which the cylinder head is constructed of an aluminum alloy or other light weight, alloyed material.

In engines which utilize fuels containing a relatively high percentage of alcohol (e.g. greater than 15% ethanol/methanol), the trapped fuel, ambient water dissolved in the fuel, vapors or all of them, may form and/or promote the formation of corrosive acids or byproducts which may corrode the cylinder head, the valve seat inserts, or both, in the areas associated with the valve seat inserts. Further, these components may promote dissimilar metal corrosion through the galvanic effect by serving as an electrolyte in contact with the dissimilar metals of the insert and cylinder head. It is also suspected that galvanic corrosion may occur between the dissimilar metal elements on the surface contacting an electrolyte such as, for instance the copper-aluminum (Cu—Al) interface in common aluminum alloys. Over time, such corrosion may affect the durability of the cylinder head and associated valve seat inserts, especially in cylinder heads which are manufactured from an aluminum alloy.

Various methods have been proposed to address corrosion associated with fuels that contain alcohol including coating the cylinder head valve seat insert pocket with epoxy or phenolic sealants prior to installation of the valve seat insert. Such materials however, if misapplied during application to other components of the engine or valves, or combusted during operation of the engine, may present potential contamination issues for devices such as oxygen sensors or other environmental devices and, therefore, must be applied with great care and precision during manufacture of the cylinder head assembly or, should be avoided.

It is therefore desirable to provide a valve seat insert and cylinder head sealing assembly that avoids corrosive activity, especially corrosion which may be caused by, or associated with, fuels containing alcohols such as ethanol and methanol, and that may also include water and other corrosive components.

SUMMARY OF THE INVENTION

In one exemplary embodiment of the present invention, a valve seat pocket gasket configured to be compressed between a cylinder head valve seat insert pocket and a valve seat insert of a cylinder head assembly comprises at least one active layer having at least one compressible sealing bead that defines a compression seal at the interface of the compressible sealing bead with the cylinder head valve seat insert pocket and the valve seat insert.

In another exemplary embodiment of the present invention, a sealing system for a cylinder head assembly of an internal combustion engine comprises a cylinder head having a combustion chamber, a port opening into the combustion chamber, a valve seat insert pocket circumferentially disposed about the port, a valve seat insert disposed within the valve seat insert pocket and a valve seat pocket gasket compressed between the valve seat insert pocket and the valve seat insert. The valve seat pocket gasket comprises at least one active layer having at least one compressible sealing bead that defines a compression seal between the valve seat insert pocket and the valve seat insert.

In yet another embodiment of the present invention a cylinder head assembly of an internal combustion engine comprises a cylinder head having a combustion chamber, a port opening into the combustion chamber, a valve movably disposed in the port and movable from a closed position to an open position, a valve seat insert pocket circumferentially disposed about the port, a valve seat insert disposed within the insert pocket, wherein in the closed position the valve is seated on the valve seat insert, and a valve seat pocket gasket compressed between the valve seat insert pocket and the valve seat insert. The valve seat pocket gasket includes at least one active layer, having at least one sealing bead under compression, defining a compression seal at the interface of the sealing bead with the valve seat insert pocket and the valve seat, to thereby prevent the ingress of fuel or water between the valve seat insert and the valve seat insert pocket and at least one stopper layer adjacent to the at lease one active layer and in compression therewith and including a stopper feature comprising a raised element defining a second compression seal at the interface of the stopper feature and the at least one active layer of material and defining a deformation limiter for the at least one active layer.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
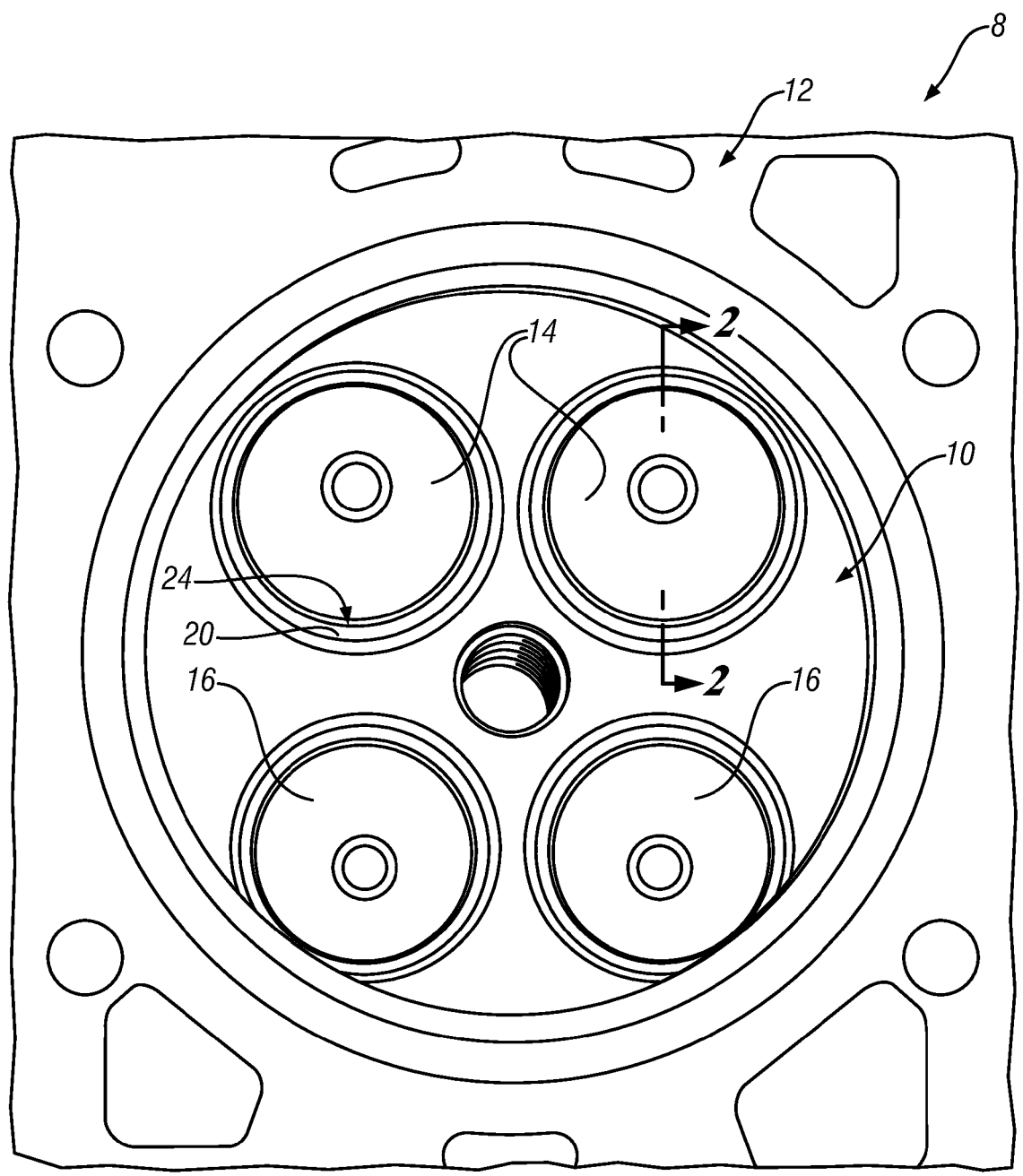
FIG. 1 is a partial plan view of an exemplary embodiment of a cylinder head portion of a combustion chamber of a cylinder head assembly for an internal combustion engine embodying features of the present invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the present invention, illustrated in FIG. 1, a cylinder head assembly 8, for an internal combustion engine (not shown), includes a cylinder head 12 having a combustion chamber 10. The combustion chamber may comprise a number of various configurations depending, in large part, on the particular engine and/or fuel system configuration (e.g., diesel or gasoline). In instances in which the piston head is relatively flat, a substantial portion of the combustion chamber may reside in the cylinder head 12. In other cases, such as in many diesel applications, a substantial portion of the combustion chamber may reside in the piston head resulting in the cylinder head comprising a simpler combustion face. For the purposes of this description, all contemplated configurations shall be referred to as a combustion chamber 10. The cylinder head 12 includes one or more intake ports 14 through which a fuel/air mixture is introduced into the combustion chamber 10 during operation of the engine. The fuel/air mixture is compressed by a reciprocating piston (not shown) and is combusted in the combustion chamber 10. The combustion event drives the reciprocation of the piston and, therefore, the engine. Exhaust ports 16 provide for the exit of the products of combustion from the combustion chamber 10.

Figure 2:
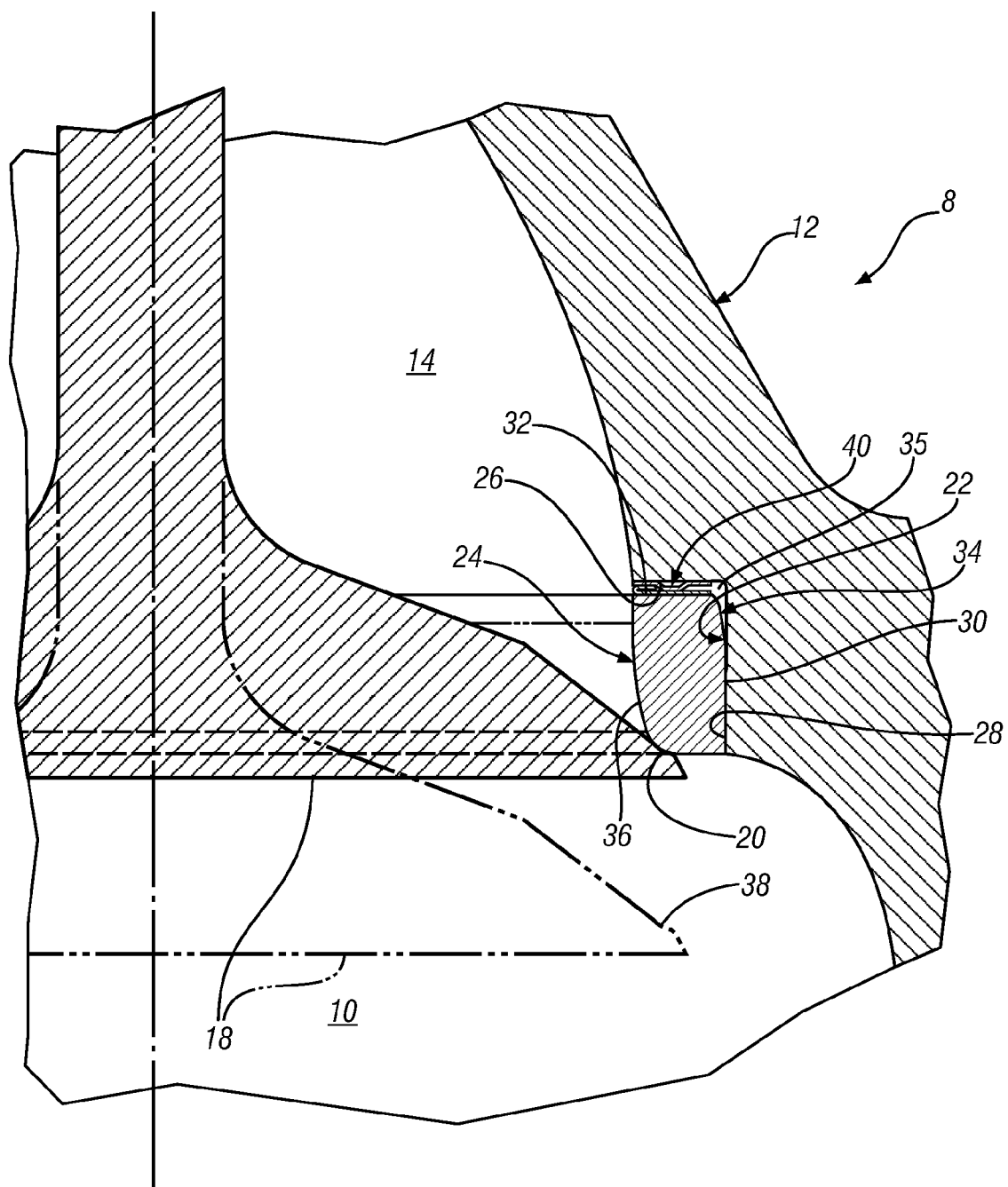
FIG. 2 is a partial sectional view of the cylinder head taken along section 2-2 of FIG. 1.

Referring to FIG. 2, a poppet valve 18 is moveably disposed within each intake port 14 of the cylinder head 12 and controls the flow of fuel and air entering the combustion chamber 10. The poppet valve 18 is selectively moveable from a closed position in which the valve engages a valve seat 20 to an open position (shown in phantom in FIG. 2) in which the poppet valve 18 is removed from the valve seat 20 to allow fuel and air to enter the combustion chamber 10. Similar poppet valves (not shown) are disposed within each exhaust port 16 and operate in a like manner as the poppet valves 18 to allow products of combustion to exit the combustion chamber 10.

Figure 3:
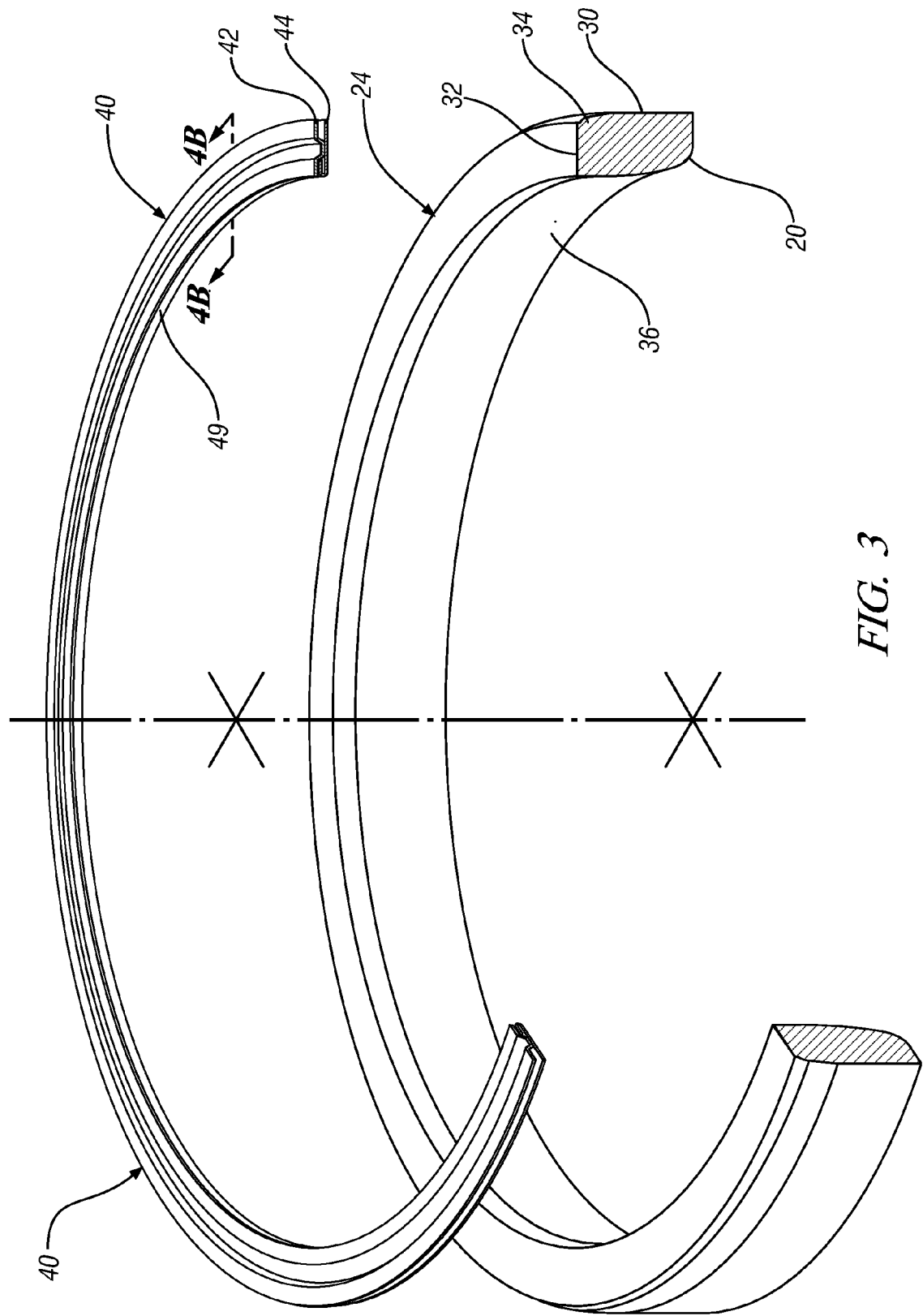
FIG. 3 is a perspective sectional view of a valve seat insert and valve seat pocket gasket embodying features of the present invention, before assembly into the cylinder head assembly of FIG. 1.
Figure 4A:
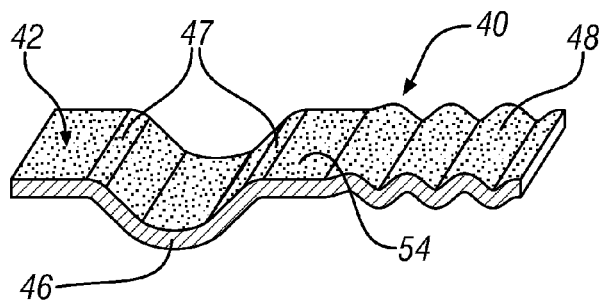
FIG. 4A-D illustrate exemplary radial cross-sections of valve seat pocket gaskets embodying features of the present invention.
Figure 4B:
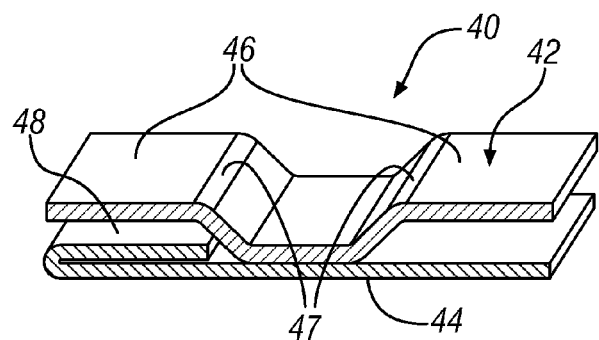
Figure 4C:
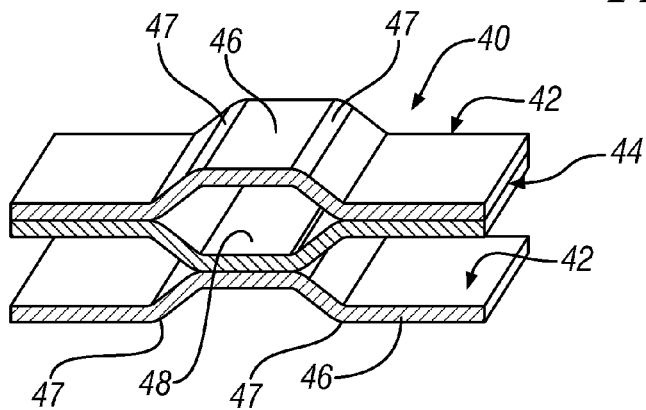
Figure 4D:
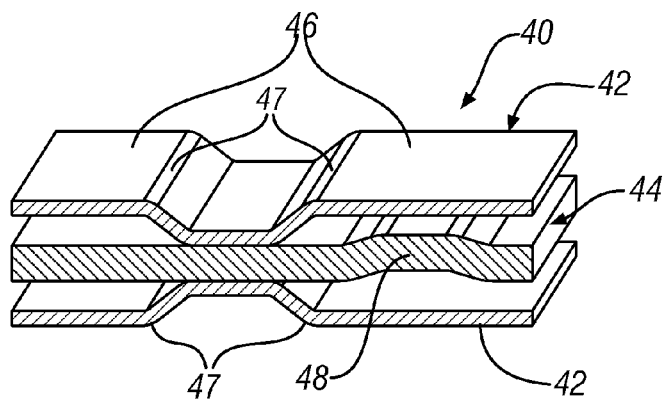

The cylinder head 12 includes integrally formed valve seat insert pockets or cavities 22 that are each configured to receive a valve seat insert 24. The valve seat insert pockets or cavities 22 may be machined into the cylinder head 12 or they may be near-net-shape cast. The valve seat insert pockets or cavities 22 are formed around or circumscribe the intake ports 14 (and exhaust ports 16) and include an insert bearing shoulder 26 and an outer annular wall 28. Referring to FIGS. 2 and 3, a valve seat insert 24 is generally circular or ring shaped and includes an outer annular surface 30 having a diameter which is slightly larger (on the order of about 0.7 μm) than the diameter of the outer annular wall 28 of the cylinder head valve seat insert pockets 22. The size differential between the diameters of the cylinder head valve seat insert pockets 22 and the valve seat inserts 24 allows for interference or "press-fit" mating between the surfaces 28 and 30. Specifically, valve seat inserts 24 are press-fit into cylinder head valve seat insert pockets 22 of the cylinder head 12 in a manner that is effective to cause the outer annular surface 30 of each valve seat insert to abutingly and frictionally engage associated annular wall 28 of each cylinder head valve seat insert pocket 22 thereby securing the valve seat insert 24 within the combustion chamber 10 of the cylinder head 12.

The outer annular surface 30 of each valve seat insert 24 may include an angled or tapered lead-in edge portion 34 connecting it to pocket seating surface 32. The tapered lead-in edge portion 34 aides in centering and guiding the valve seat insert 24 into a cylinder head valve seat insert pocket 22 during the press-fitting process. In some cases, due to the tapered lead-in edge portion 34 a small annular void 35 may be formed between valve seat insert 24 and the cylinder head valve seat insert pockets 22. During operation of the engine, this annular void 35 may trap various intake or exhaust materials, including, for example, debris, corrosive components, liquids (e.g., fuel, water and the like), vapors such as unburned vaporized fuel or water, or a combination thereof that exist in the combustion chamber or intake or exhaust ports and are transported along the interface between the bearing shoulder 26 and the pocket seating surface 32 of valve seat insert 24 to the void. Such contamination may lead to corrosion of the cylinder head 12 and/or the valve seat insert 24. Additionally, each valve seat insert 24 includes an inner annular surface 36 having an angled or ramped portion or valve seat 20 which is adapted to conformingly and sealingly receive and engage the outer sealing surface 38 of a poppet valve 18 to allow the poppet valve to selectively seal intake or exhaust port 14, 16 respectively, of combustion chamber 10. The valve seat inserts 24 may be manufactured from a relatively durable, wear-resistant and heat treated metal material, such as hardened, heat-treated sintered powder metal, cast steel or iron.

Referring to FIGS. 2, 3 and 4A-4D, in exemplary embodiments, a valve seat pocket gasket, referred to generally as 40 is disposed between each valve seat insert 24 and valve seat insert pocket 22 of the cylinder head 12. The valve seat pocket gasket 40 may be constructed as a single layer ("SL") gasket, FIG. 4A, or as a multi-layer ("ML") gasket, FIGS. 4 B, C and D, that utilize various sealing features or functions to seal and prevent the ingress of intake or exhaust materials at the interface of the valve seat insert 24 and the valve seat insert pocket 22 in the area of the insert bearing shoulder 26 and the pocket seating surface 32. The valve seat pocket gasket 40 may include one or more of a first or active layer 42. The active layer may be constructed of a relatively hard, stiff material such as stainless steel, spring steel, plastic, composites or any combination thereof. The material properties of the active layer 42 provide for a degree of non-deformable flexibility when placed in compression, the advantages of which will be further described. The valve seat pocket gasket 40 may also include a second, passive layer 44 that may be constructed of a softer, less flexible material having a lower hardness than that of the active layer 42, such as lower hardness stainless steel, low carbon steel, polymers, elastomers or other suitable low hardness material, or a combination thereof.

As illustrated in the examples of FIG. 4A-4D, the one or more active layer(s) 42 includes one or more circumferentially extending, compressible seals or beads 46 that may be formed by stamping of the material during construction of the gasket. The seals or beads 46 may take one of several forms or cross-sections such as a protruding arch or a raised and flattened stepped configuration. In an exemplary embodiment, a second stopper layer 44 includes a stopper feature 48. The stopper feature 48 may comprise a raised land or element that functions as a seal element when compressed against the active layer or layers 42 as well as a deformation limiter for the assembled valve seat pocket gasket 40 when assembled into the cylinder head assembly 8, as described herein. The active layer or layers 42 and the stopper layer or layers 44 may be physically connected to one another such as by welding or crimping, to form a single piece valve seat pocket gasket 40 or may be placed adjacent to one another without mechanically fixing the active and stopper layers 42, 44 respectively.

Figure 5:
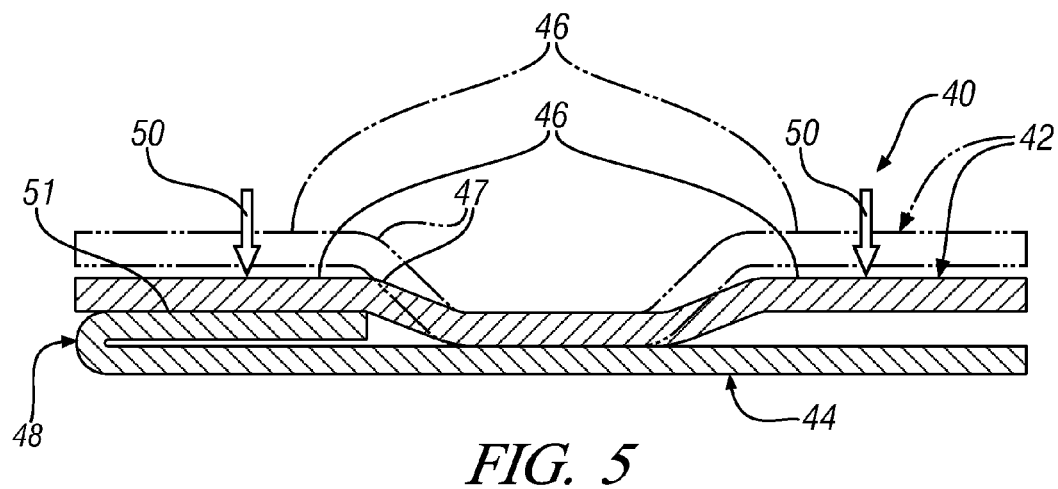
FIG. 5 is a radial cross section of the valve seat pocket gasket of FIG. 4B, under compression.

Referring again to FIG. 2, to assemble the cylinder head assembly 8, one exemplary embodiment of a valve seat pocket gasket 40 (FIG. 4B) is first disposed in each valve seat insert pocket 22. A valve seat insert 24 is press-fit into each valve seat insert pocket 22 trapping the valve seat pocket gasket 40 between insert bearing shoulder 26 and pocket seating surface 32. Referring to FIG. 5, during the press-fit of the valve seat insert 24 into the cylinder head valve seat insert pocket 22 the seals or beads 46 of the active layer 42 are deformed under the pressure of the operation. This deformation will establish a compression seal at the interface of the sealing beads 46 and the bearing shoulder 26, the pocket seating surface 32, or both depending on the number and location of the sealing beads. In an exemplary embodiment, due to the bending stress imposed upon the active layer 42 during compression, the highest levels of compression, and thereby sealing, between the sealing beads 46 and the bearing shoulder 26, the pocket sealing surface 32, or both will be along the transition lines 47 that are defined at the transitions in the first or active layer 42 at the seals 46. In an exemplary embodiment, the stopper feature 48, formed in the stopper layer 44, operates during the press-fit of the valve seat inserts 24 into the valve seat insert pockets 22 to limit the deformation of the active layer 42 and, more particularly the sealing bead or beads 46 to thereby assure a more effective seal 50. The compression of the stopper feature 48 also establishes a seal 51 at the interface with active layer 42 to prevent the ingress of fuel or water.

Referring again to FIG. 4A, to enhance the sealing ability of the valve seat pocket gasket 40 against the surface roughness of the insert bearing shoulder 26 or pocket seating surface 32 of the valve seat insert 24, a thin seal coating 54 may be applied to the valve seat pocket gasket 40 and the insert bearing surface 26. The coating 54 may be preferentially applied to the seals 46, the stopper features 48 or both, or it may, for ease of manufacturing be applied to the entire surface of the valve seat pocket gasket 40. When compressed between the cylinder head 12 and valve seat inserts 24, seal coating 54 layered on the valve seat pocket gasket deforms plastically or elastically, thereby improving the sealing characteristics of the sealing assembly. The seal coating 54 may comprise any high temperature, durable and compressible material. Examples include high temperature composite materials such as molybdenum disulfide, polytetrafluoroethylene (PTFE or Teflon®), epoxy and phenolic, silicone, aluminum epoxy ester, graphite, polyacrylic, RTV, or rubber, ceramic, or a combination thereof.

Figure 6:
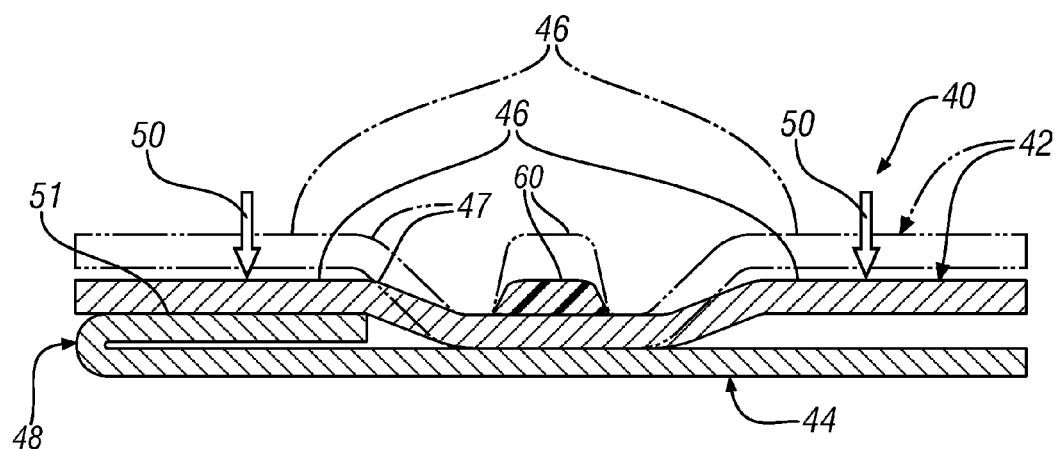
FIG. 6 is a radial cross section of another exemplary valve seat pocket gasket under compression.

The valve seat pocket gasket 40 operates to effectively seal the surface 26 of the valve seat insert pockets 22, as well as the pocket seating surface 32, including the tapered lead-in edge portion 34, of the valve seat inserts 24 from exposure to various intake and exhaust constituent materials, including alcohol based fuels that may contain ethanol, methanol, water dissolved in the fuel, vapor or any combination thereof, which may become trapped in gaps or voids between the valve seat inserts 24 and the valve seat insert pockets 22. A sealing layer 54 may act to provide a further improvement in the sealing characteristics of the valve seat pocket gasket 40 in that it will enhance resistance to corrosion via the formation of an impervious or semi-impervious protective layer (e.g. seal) at the interface of the gasket 40 with the cylinder head 12 and the valve seat inserts 24 that will operate to slow or prevent a chemical attack caused by the corrosive media present by reducing or eliminating the ingress of such corrosive media into such locations. As an alternative to, or in addition to the sealing layer 54, it is contemplated that a compressible sealing bead 60, FIG. 6, may be disposed between one or more of the sealing beads 46. Upon the application of a compressive force 50, the compressible sealing bead 60 will also be compressed between the sealing beads 46 and the bearing shoulder 26, the pocket seating surface 32, or both, depending on the number and location of the compressible sealing beads 60.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A valve seat pocket gasket configured to be compressed between a cylinder head valve seat insert pocket and a valve seat insert of a cylinder head assembly comprising:
　　at least one active layer having at least one compressible sealing bead, defining a compression seal at the interface of the compressible sealing bead with the cylinder head valve seat insert pocket and the valve seat insert; and
　　at least one passive stopper layer adjacent to the at least one active layer.

2. The valve seat pocket gasket of claim 1, further comprising:
　　a stopper feature formed in the at least one passive stopper layer, comprising a raised element defining a deformation limiter for the at least one active layer.

3. The valve seat pocket gasket of claim 1, wherein the at least one active layer comprises stainless steel, spring steel, engineering plastic, composites or any combination thereof.

4. The valve seat pocket gasket of claim 1, wherein the at least one passive stopper layer has a hardness that is lower than a hardness of the active layer, and wherein the stopper layer comprises a stainless steel, low carbon steel, polymer, elastomer, or a combination thereof.

5. The valve seat pocket gasket of claim 1, wherein the at least one compressible sealing bead comprises a protruding arch cross-section.

6. The valve seat pocket gasket of claim 1, wherein the at least one compressible sealing bead comprises a raised and flattened stepped cross-section.

7. The valve seat pocket gasket of claim 1, wherein the first active layer, having at least one compressible sealing bead is located adjacent to a first side of the at least one passive stopper layer and, further comprising a second active layer, having at least one compressible sealing bead located adjacent to a second side of the at least one passive stopper layer.

8. The valve seat pocket gasket of claim 1, further comprising:
a seal coating applied to the valve seat pocket gasket and deformable plastically or elastically to enhance sealing between the at least one compressible sealing bead and the cylinder head valve seat insert pocket and the valve seat insert.

9. The valve seat pocket gasket of claim 8, wherein the seal coating comprises a high temperature, durable and compressible material selected from the group consisting of molybdenum disulfide, polytetrafluoroethylene (PTFE or Teflon®), epoxy and phenolic, silicone, aluminum epoxy ester, graphite, polyacrylic, RTV, or rubber, ceramic, or a combination thereof.

10. A sealing system for a cylinder head assembly of an internal combustion engine, comprising:
a cylinder head having a combustion chamber;
a port opening into the combustion chamber;
a valve seat insert pocket circumferentially disposed about the port;
a valve seat insert disposed within the valve seat insert pocket; and
a valve seat pocket gasket compressed between the valve seat insert pocket and the valve seat insert comprising:
at least one active layer having at least one compressible sealing bead, defining a compression seal between the valve seat insert pocket and the valve seat insert; and
at least one passive stopper layer adjacent to the at least one active layer.

11. The sealing system for a cylinder head assembly of an internal combustion engine of claim 10, further comprising:
a stopper feature extending from the passive stopper layer comprising a raised element defining a second compression seal at the interface of the raised element and the active layer and defining a deformation limiter for the at least one active layer.

12. The sealing system for a cylinder head assembly of an internal combustion engine of claim 10, wherein the at least one active layer comprises stainless steel, spring steel, engineering plastic, composites or any combination thereof.

13. The sealing system for a cylinder head assembly of an internal combustion engine of claim 10, wherein the at least one passive stopper layer has a hardness that is lower than a hardness of the at least one active layer, and wherein the passive stopper layer comprises a stainless steel, low carbon steel, polymer, elastomer, or a combination thereof.

14. The sealing system for a cylinder head assembly of an internal combustion engine of claim 10, wherein the at least one compressible sealing bead comprises a protruding arch cross-section.

15. The sealing system for a cylinder head assembly of an internal combustion engine of claim 10, wherein the at least one compressible sealing bead comprises a raised and flattened stepped cross-section.

16. The sealing system for a cylinder head assembly of an internal combustion engine of claim 10, wherein the first active layer having at least one compressible sealing bead is located adjacent to a first side of the at least one passive stopper layer and, further comprising a second active layer having at least one compressible sealing bead located adjacent to a second side of the at least one passive stopper layer.

17. The valve seat pocket gasket of claim 10, further comprising:
a seal coating applied to the valve seat pocket gasket and deformable plastically or elastically to enhance sealing between the at least one compressible sealing bead and the cylinder head valve seat insert pocket and the valve seat insert.

18. The valve seat pocket gasket of claim 17, wherein the seal coating comprises a high temperature, durable and compressible material selected from the group consisting of molybdenum disulfide, polytetrafluoroethylene (PTFE or Teflon®), epoxy and phenolic, silicone, aluminum epoxy ester, graphite, polyacrylic, RTV, or rubber, ceramic, or a combination thereof.

19. A cylinder head assembly of an internal combustion engine, comprising:
a cylinder head having a combustion chamber;
a port opening into the combustion chamber;
a valve movably disposed in the port and movable from a closed position to an open position;
a valve seat insert pocket circumferentially disposed about the port;
a valve seat insert disposed within the insert pocket, wherein in the closed position the valve is seated on the valve seat insert; and
a valve seat pocket gasket compressed between the valve seat insert pocket and the valve seat insert comprising:
at least one active layer, having at least one sealing bead under compression, defining a compression seal at the interface of the sealing bead with the valve seat insert pocket and the valve seat, to thereby prevent the ingress of fuel or water between the valve seat insert and the valve seat insert pocket; and
at least one stopper layer adjacent to the at least one active layer and in compression therewith and including a stopper feature comprising a raised element defining a second compression seal at the interface of the stopper feature and the at least one active layer of material and defining a deformation limiter for the at least one active layer.

20. The cylinder head assembly of an internal combustion engine of claim 19, wherein the first active layer having at least one compressible sealing bead is located adjacent to a first side of the at least one passive stopper layer and, further comprising a second active layer having at least one compressible sealing bead located adjacent to a second side of the at least one passive stopper layer.

* * * * *